US011998927B2

United States Patent
Weng

(10) Patent No.: US 11,998,927 B2
(45) Date of Patent: Jun. 4, 2024

(54) METHOD AND DEVICE FOR CONTROLLING A PROCESS WITHIN A SYSTEM, IN PARTICULAR A GRINDING PROCESS IN A GRINDING DEVICE

(71) Applicant: AIXPROCESS GMBH, Aachen (DE)

(72) Inventor: Martin Weng, Aachen (DE)

(73) Assignee: AIRPROCESS GMBH, Aachen (DE)

( * ) Notice: Subject to any disclaimer, the term of this patent is extended or adjusted under 35 U.S.C. 154(b) by 542 days.

(21) Appl. No.: 16/757,715

(22) PCT Filed: Oct. 15, 2018

(86) PCT No.: PCT/EP2018/077997
§ 371 (c)(1),
(2) Date: Apr. 20, 2020

(87) PCT Pub. No.: WO2019/076785
PCT Pub. Date: Apr. 25, 2019

(65) Prior Publication Data
US 2021/0197205 A1    Jul. 1, 2021

(30) Foreign Application Priority Data
Oct. 20, 2017   (EP) .................................... 17020486

(51) Int. Cl.
*B02C 25/00*    (2006.01)
*G05B 13/04*    (2006.01)

(52) U.S. Cl.
CPC ............ *B02C 25/00* (2013.01); *G05B 13/041* (2013.01); *G05B 13/042* (2013.01); *G05B 13/048* (2013.01)

(58) Field of Classification Search
CPC .... B02C 25/00; G05B 13/041; G05B 13/042; G05B 13/048
See application file for complete search history.

(56) References Cited

U.S. PATENT DOCUMENTS 9,486,809 B2    11/2016  Held et al.
2005/0137995 A1   6/2005  Wintrich et al.
(Continued)

FOREIGN PATENT DOCUMENTS

DE    102010062204    5/2012
EP    1396770          7/2007

OTHER PUBLICATIONS

Franz Wintrich, "Method of regulating a thermodynamic process" (machine translation), Aug. 16, 2002, Espacent Patent Search (Year: 2002).*

(Continued)

*Primary Examiner* — Christopher W Carter
(74) *Attorney, Agent, or Firm* — Grossman, Tucker, Perreault & Pfleger, PLLC

(57) ABSTRACT

A method for controlling a process within a system, in particular a grinding process in a grinding device, comprising the following steps: .detecting 1 of state variables ($s_t$) of the system; creating 2 of at least two process models (PM), each describing the effects of actuating actions ($a_t$) on the state variables ($s_t$) of the system, wherein the structure of the at least two process models (PM) differs from each other; controlling 3 of the process within the system by executing actuating actions ($a_t$) under consideration of predefined control objectives and the process model, which currently provides the best prediction for the process running in the system. A device for carrying out the method according to the invention.

19 Claims, 1 Drawing Sheet

(56) References Cited

U.S. PATENT DOCUMENTS

| | | | |
|---|---|---|---|
| 2007/0220386 A1* | 9/2007 | Craig | G01R 31/318357 |
| | | | 714/728 |
| 2012/0191235 A1* | 7/2012 | Shin | G06Q 10/04 |
| | | | 700/104 |
| 2013/0189801 A1* | 7/2013 | Molnar | H01L 22/12 |
| | | | 438/8 |
| 2013/0248626 A1* | 9/2013 | Held | B02C 25/00 |
| | | | 241/33 |
| 2015/0161520 A1* | 6/2015 | Kaushal | G05B 19/41885 |
| | | | 700/121 |

OTHER PUBLICATIONS

International Search Report from corresponding PCT Appln. No. PCT/EP2018/077997, dated Jan. 25, 2019.
Written Opinion from corresponding PCT Appln. No. PCT/EP2018/077997, dated Jan. 25, 2019.

* cited by examiner

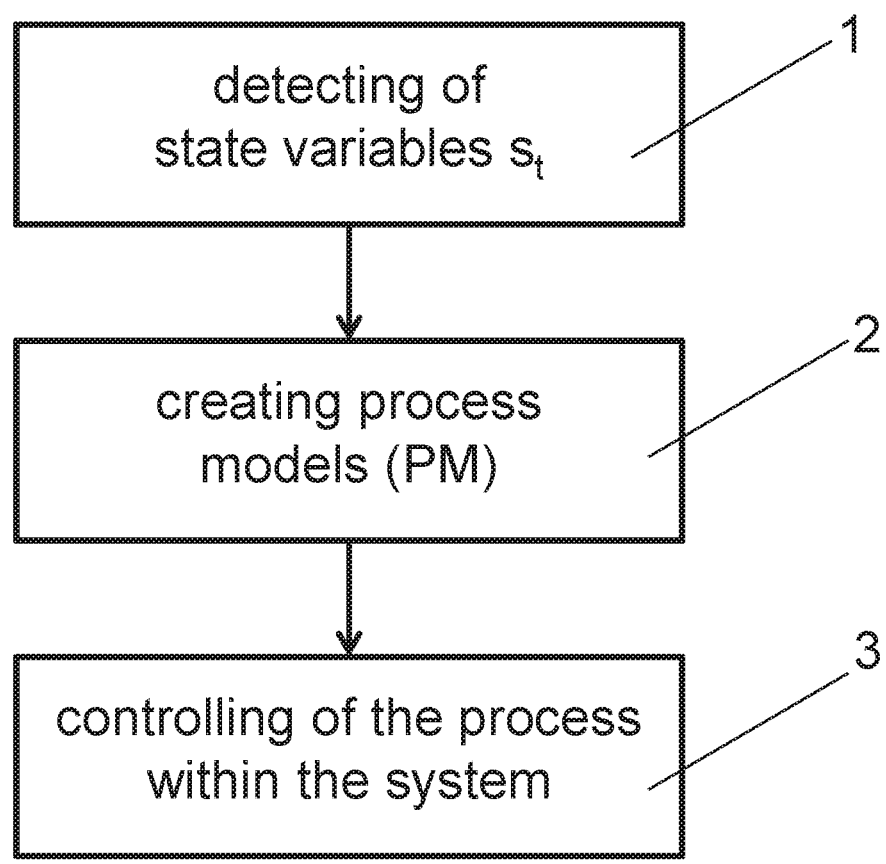

METHOD AND DEVICE FOR CONTROLLING A PROCESS WITHIN A SYSTEM, IN PARTICULAR A GRINDING PROCESS IN A GRINDING DEVICE

FIELD

The invention concerns a method for controlling a process within a system, in particular a grinding process in a grinding device. The invention also concerns a device for carrying out the method in accordance with the invention.

BACKGROUND

In such procedures, state variables of the system are captured, preferably by measuring process variables in the system. Furthermore, a process model is created which describes the effects of actuating actions on the state variables of the system, for example by means of computer-based neural networks. The controlling of the process within the system is carried out by performing actuating actions and taking into account predetermined control objectives and the created process model.

Further, DE 10 2010 062 204 A1 discloses a method for operating a mill having continuous input and output mass flows comprising the following steps:
using a process model based on power balance equations having characteristic process variables for detecting a mill condition, wherein each change in an energy content of the mill mass and its content masses, corresponds to a difference of energy inflow and energy outflow;
additionally using a process model based on mass flows as mass balance equations having characteristic process variables for detecting the mill condition, wherein each change in the mill contents masses corresponds to a difference of mass flows into and mass flows out of the mill;
measuring of characteristic process variables outside the mill;
estimating respective characteristic process variables by inserting the measured values into a respective current account equation assuming that the other process variables are known or negligible; and
controlling of the mill by means of the estimated characteristic process variables.

SUMMARY

It is an object of the present invention to improve the accuracy of the known methods.

According to the invention the object is solved by a method for controlling a process within a system, in particular a grinding process in a grinding device, comprising the following steps:
capturing of state variables ($s_t$) of the system;
creating at least two process models (PM), each describing the effects of actuating actions ($a_t$) on the state variables ($s_t$) of the system, wherein the structure of the at least two process models (PM) differs from each other; and
controlling of the process within the system by executing actuating actions ($a_t$) taking into account predefined control objectives and the process model which currently provides the best prediction for the process running in the system.

The present invention is based on the insight that the creation of at least two process models (PM), which each describe the effect of actuating actions ($a_t$) on the state variables (st) of the system, whereby the structure of the at least two process models (PM) differs from each other, significantly improves the accuracy of the invention-based method for controlling a process within a system. A process model (PM) is a mathematical model that depicts the process running in the real system, whereby the process model (PM) describes the effect of actuating actions ($a_t$) on the state variables ($s_t$) of the system. Since the process running in the real system is influenced by a multitude of influences, such as actuating actions ($a_t$) or disturbance influences, a process model (PM) based on a mathematical model can only describe the process running in the real system with sufficient accuracy for a certain range of state variables ($s_t$) and effects of actuating actions ($a_t$) on the state variables ($s_t$). By creating at least two process models (PM) according to the invention, whereby the at least two process models (PM) differ from each other in their structure, it is achieved according to the invention that at least one optimized process model (PM) for controlling the process within the system is available in each case for different ranges of state variables ($s_t$) and effects of actuating actions ($a_t$) on the state variables ($s_t$). According to the invention it turned out that the additional effort for the creation of at least a second process model (PM) is negligible compared to the improved accuracy of the process.

According to a variant of the invention, the state variables ($s_t$) are recorded by means of sensors of the grinding device or manual and/or automatic sample evaluations. It is preferable to acquire the state variables ($s_t$) by means of sensors, as this can be done continuously. For example, the grinding process within the grinding device can be monitored by means of a microphone and/or automatic measurement of the starting product. However, if state variables ($s_t$) cannot be recorded directly with sensors, manually and/or automatically taken samples must be evaluated and made available to the inventive method.

According to a variant of the method according to the invention, the at least two process models (PM) are continuously adapted by the effects of actuating actions ($a_t$) on the state variables ($s_t$) of the grinding device. Since the inventive method of controlling the process within the system is carried out continuously, the effects of the previous actuating actions ($a_{t-1}$) on the previous state variables ($s_{t-1}$) of the system are captured by the inventive method when the state variables (st) of the system are captured. These captured changes of the state variable ($_{st}$) of the system can be used to continuously adapt the at least two process models (PM), for example by taking into account the change of the state variable ($s_t$) from the previous state variables ($s_{t-1}$) of the system and the effects of the actuating actions ($a_{t-1}$) of the previous point in time. Thus, the at least two process models (PM) are continuously improved.

In a variant of the method according to the invention, the at least two process models (PM) are created by means of a test run of the system with at least exemplary execution of possible actuating actions ($a_t$) and/or by expert knowledge. Process models (PM) created in this way can subsequently be continuously adapted by the effects of actuating actions ($a_t$) on the state variables ($s_t$) of the system, as previously described in more detail. Following a practical variant of the invention, the at least two process models (PM) are each created using a computer-based neural network and, in particular, continuously adapted (trained). The neural network can be trained in particular by means of known evolutionary strategies, genetic algorithms, genetic programming or evolutionary programming, preferably within the framework of an autonomous selection and/or optimization process.

According to a further variant of the method according to the invention, the at least two process models (PM) each consider several assumed future effects of actuating actions ($a_{t+1}$) on the state variables ($s_{t+1}$) of the grinding device. The at least two process models (PM) thus take into account a prediction of assumed effects of actuating actions ($a_{t+1}$) on the state variables ($s_{t+1}$) of the system.

Consequently, the at least two process models (PM) can consider past effects of actuating actions ($a_{t-1}$) on the state variables ($s_{t-1}$) of the system, continuously consider the effects of actuating actions ($a_t$) on the state variables ($s_t$) of the system, and also generate and consider a prediction of the assumed future effect of actuating actions ($a_{t+1}$) on the state variables ($s_{t+1}$) of the system.

According to a further variant of the method according to the invention, the at least two process models (PM) are created and/or optimized under consideration of different time scales. Thus, for example, one of at least two process models (PM) can be optimized for short-term effects of actuating actions ($a_t$) on the state variables ($s_t$) of the system, while the other of at least two process models (PM) can be optimized for long-term effects of actuating actions ($a_t$) on the state variable ($s_t$) of the system. When controlling the process within the system, one of the at least two process models (PM) can be taken into account depending on the time horizon and corresponding actuating actions ($a_t$) can be carried out under consideration of specified control objectives.

According to another variant, the inventive method comprises the steps of the:
  creating a situation assessment (SB) using quality functions ($u_t$) that assesses the state variables ($s_t$) against the control objectives; and
  deciding whether a control is required at the current time to adapt the state variables ($s_t$) to the control objectives.

The situation evaluation (SB) takes into account the costs associated with the actuating actions ($a_t$) by means of the quality function ($u_t$) and compares these with the current state variables ($s_t$) and the specified control objectives. On the basis of such a situation evaluation (SB) it can be decided whether a control is necessary and/or useful at the current time to adapt the state variables ($s_t$) to the control objectives or whether an adaptation of the state variables ($s_t$) to the control objectives by means of actuating actions ($a_t$) can be dispensed with.

In a variant of the method according to the invention, the effects of different actuating actions ($a_t$) on the state variables ($s_t$) are calculated several time steps in advance and an overall quality (Q) is evaluated. On the basis of the overall quality (Q) it can be decided whether a control is required at the current time in order to adapt the state variables ($s_t$) to the control objectives or whether an adaptation of the state variables ($s_t$) to the control objectives is waived first. Since the total quality (Q) considers several time steps in advance, short-term changes in the state variable ($s_t$), for example, can be filtered out, since such short-term changes in the state variable ($s_t$) only have a small influence on the total quality (Q). Thus, unnecessary adjustments of the state variables ($s_t$) by actuating actions ($a_t$) can be avoided According to an advantageous variant of the invention, the quality functions ($u_t$) are set up by means of statistical methods, such as in particular artificial intelligence (AI approaches) or according to the rules of fuzzy logic.

According to a particularly advantageous variant of the invention, the method is executed in real time to control the process within the system.

According to another advantageous variant of the invention, at least one, preferably both, of the at least two process models (PM) is based on the method of Computational Fluid Dynamics (CFD).

In another preferred variant of the method according to the invention, similar state variables ($s_t$) of the system are combined in a group, whereby at least one process model (PM) is created for each group. Grouping similar state variables ($s_t$) of the system into groups has the advantage of reducing the number of different process models (PM), thus saving resources. The classification of similar state variables ($s_t$) of the system into groups is preferably self-learning and self-optimizing. For example, cost functions are taken into account that compare the costs of grouping state variables ($s_t$) of the system into a group with the costs of creating a new group.

A new group and a new process model (PM) are created in a variant of the inventive method if state variables ($s_t$) of the system are recorded that have not yet been assigned to a group and/or that cannot be assigned to an existing group taking into account the aforementioned cost functions.

It is useful to assign a unique identification code to each group.

According to a variant of the inventive method, the at least two process models (PM) are based on evolutionary strategies, genetic algorithms, genetic programming or evolutionary programming or are trained on these, preferably within the framework of an autonomous selection and/or optimization process.

The invention also concerns a device for carrying out the method in accordance with the invention, comprising a grinding device to be controlled with sensors for detecting state variables ($_{st}$), an actuating device for carrying out actuating actions ($a_t$) and a control device connected to the grinding device, preferably a computing device.

BRIEF DESCRIPTION OF THE DRAWINGS

In the following, the method in accordance with the invention is explained in more detail on the basis of the exemplary embodiment shown in FIG. 1.

FIG. 1 illustrates the sequence of an inventive method for controlling a process within a system, in particular a grinding process in a grinding device.

DETAILED DESCRIPTION

FIG. 1 shows the sequence of an inventive process for controlling a process within a system, in particular a grinding process in a grinding device.

In a first step, the state variables ($s_t$) of the system are recorded 1. The state variables ($s_t$) of the system are recorded 1, for example, by means of sensors of the grinding device or manual and/or automatic sample evaluations. It is preferable to record 1 the state variables ($s_t$) by means of sensors, as this can take place continuously. The grinding process within a grinding device can, for example, be monitored by means of a microphone and/or automatic measurement of the starting product. In the event that state variables cannot be recorded 1 directly with sensors, samples can be taken manually and/or automatically and evaluated, and the result of the evaluation can be made available to the method according to the invention.

In the next step of the method according to the invention, at least two process models (PM) are created, each of which describes the effects of actuating actions ($a_t$) on the state variables ($s_t$) of the system. According to the invention, the structure of the at least two process models (PM) differs from each other.

The at least two process models (PM) are preferably adapted continuously by the effects of actuating actions ($a_t$) on the state variables ($s_t$) of the grinding device. For this purpose, the effects of the previous actuating actions ($a_{t-1}$) on the previous state variables ($s_{t-1}$) of the system are taken into account by the method according to the invention when recording 1 the state variables ($s_t$) of the system. The recorded changes of the state variables ($s_t$) of the system can be used to continuously adapt the at least two process models (PM), for example by taking into account the change of the state variables ($s_t$) from the previous state variables ($s_{t-1}$) of the system and the effects of the actuating actions ($a_{t-1}$) of the previous point in time.

The at least two process models (PM) are created, for example, by means of a test run of the system with at least exemplary execution of possible actuating actions ($a_t$) and/or by expert knowledge 2. The two process models (PM) created can subsequently be continuously adapted by the effects of actuating actions ($a_t$) on the state variables ($s_t$) of the system, as explained in more detail above.

The at least two process models (PM) can be created by means of a computer-based neural network and, in particular, continuously adapted (trained). In particular, neural networks can be created and/or trained by means of known evolutionary strategies, genetic algorithms, genetic programming or evolutionary programming, preferably within the framework of an autonomous selection and/or optimization process.

In order to improve the accuracy of the method according to the invention, the at least two process models (PM) can each take into account several assumed future effects of actuating actions ($a_{t+1}$) on the state variables ($s_{t+1}$) of the grinding device.

Consequently, the at least two process models (PM) advantageously taking into account past effects of actuating actions ($a_{t-1}$) on the state variables ($s_{t-1}$) of the system and current effects of actuating actions ($s_t$) on the state variables ($s_t$) of the system and in predicting the assumed future effects of actuating actions ($a_{t+1}$) on the state variables ($s_{t+1}$) of the system.

According to a preferred variant of the method according to the invention, the at least two process models (PM) are created and/or optimized under consideration of different time scales. Thus, for example, one of at least two process models (PM) can be optimized for short-term effects of actuating actions ($a_t$) on the state variables ($s_t$) of the system, while the other of at least two process models (PM) can be optimized for long-term effects of actuating actions ($a_t$) on the state variables ($s_t$) of the system.

After a further advantageous variant of the method according to invention, similar state variables ($s_t$) of the system are grouped together, whereby at least one process model (PM) is created for each group.

The classification of similar state variables ($s_t$) of the system into groups is preferably self-learning and self-optimizing. For example, cost functions are taken into account that compare the costs of grouping state variables ($s_t$) of the system into a group with the costs of creating a new group.

For example, a new group and a new process model (PM) is created 2 when system state variables ($s_t$) are captured that have not yet been assigned to a group and/or that cannot be assigned to an existing group taking into account the above cost functions.

It is useful to assign a unique identification code to each group.

In the next step of the method according to the invention, the process within the system is controlled 3 by carrying out actuating actions ($a_t$) under consideration of given control objectives and the process model (PM), which currently provides the best prediction for the process running in the system.

Preferably, the inventive method is executed in real time to control the process within the system. According to a particularly practical variant of the invention, at least two process models (PM) are based on the method of numerical fluid mechanics (CFD=Computational Fluid Dynamics).

In a useful way, the at least two process models (PM) are also based on or trained on evolutionary strategies, genetic algorithms, genetic programming or evolutionary programming, preferably within the framework of an autonomous selection and/or optimisation process.

According to a further variant, the method according to the invention comprises the following steps of the process, which are not described in more detail in FIG. 1:

creating a situation assessment (SB) using quality functions ($u_t$) that assesses the state variables ($s_t$) against the control objectives; and deciding whether a control is required at the current time to adapt the state variables ($s_t$) to the control objectives.

The situation evaluation (SB) takes into account, by means of the quality function ($u_t$), the costs associated with the actuating actions ($a_t$) and compares these with the current state variables ($s_t$) and the specified control objectives. On the basis of such a situation evaluation (SB) it can be decided whether a control is necessary and/or useful at the current time to adapt the state variables ($s_t$) to the control objectives or whether an adaptation of the state variables ($s_t$) to the control objectives by means of actuating actions ($_{at}$) can be dispensed with.

It is useful to calculate the effects of different actuating actions ($a_t$) on the state variable ($s_t$) several time steps in advance and to evaluate an overall quality (Q). On the basis of the overall quality (Q) it can be decided whether a control is required at the current time in order to adapt the state variable ($s_t$) to the control objectives or whether an adaptation of the state variable ($s_t$) to the control objectives can be dispensed with initially. Since the total quality (Q) considers several time steps in advance, short-term changes in the state variable ($s_t$), for example, can be filtered out, since such short-term changes in the state variable ($s_t$) only have a small influence on the total quality (Q).

The quality function ($u_t$) is established, for example, by means of statistical methods, such as artificial intelligence (AI approaches in particular) or according to the rules of fuzzy logic.

REFERENCE CHARACTER LIST 1 detecting state variables ($s_t$)
2 creating the process models (PM)
3 controlling the process within the system

What is claimed is:

1. A method for controlling a process within a system, in particular a grinding process in a grinding device, comprising:

detecting state variables ($s_t$) of the system with the grinding device, wherein similar state variables ($s_t$) of the system are grouped together and wherein the classification of similar state variables ($s_t$) of the system into groups is self-learning and self-optimizing and compares the costs of grouping state variables ($s_t$) of the system into a group with the costs of creating a new group;

creating at least two process models (PM) from each group of state variables ($s_t$) after each group of state variables ($s_t$) is created, which each describe predicted effects of actuating actions ($a_t$) on the group of state variables ($s_t$) of the system, a structure of the at least two process models (PM) differing from one another, wherein at least one of the at least two process models (PM) is created for short-term effects of the actuating actions ($a_t$) on the group of the state variables ($s_t$) of the system and at least another one of the at least two process models (PM) is created for long-term effects of the actuating actions ($a_t$) on the group of the state variables ($s_t$) of the system;

controlling of the grinding process within the system by executing actuating actions ($a_t$) under consideration of predefined control objectives and a process model of the at least two process models (PM) which currently provides the best prediction for the grinding process within in the system; and wherein grouping similar state variables ($s_t$) of the system into groups reduces the process models (PM) of the state variables ($s_t$) to save resources.

2. The method according to claim 1, wherein the state variables ($s_t$) are detected by sensors of the grinding device.

3. The method according to claim 1, wherein the at least two process models (PM) are continuously adapted by the effects of actuating actions ($a_t$) on the state variables ($s_t$) of the grinding device system.

4. The method according to claim 1, wherein the at least two process models (PM) are created by a test run of the grinding device with at least an exemplary execution of actuating actions ($a_t$).

5. The method according to claim 1, wherein the at least two process models (PM) are each created by a computer-based neural network and are continuously adapted.

6. The method according to claim 1, wherein the at least two process models (PM) each take into account several assumed future effects of actuating actions ($a_{t+1}$) on the state variables ($s_{t+1}$) of the system.

7. The method according to claim 1, further comprising the steps of:

creating a situation assessment (SB) by quality functions ($u_t$), which assesses the state variables ($s_t$) with respect to the control objectives; and deciding whether a control is required at the current time to adapt the state variables ($s_t$) to the control objectives.

8. The method according to claim 7, wherein the effects of different actuating actions ($a_t$) on the state variables ($s_t$) are calculated several time steps in advance and an overall quality (Q) is evaluated.

9. The method according to claim 7, wherein the quality functions ($u_t$) are established by statistical method.

10. The method according to claim 9, wherein the statistical method includes artificial intelligence and/or fuzzy logic.

11. The method according to claim 1, wherein the method is performed in real time to control the grinding process within the system.

12. The method according to claim 1, wherein at least one of said at least two process models (PM) is based on the method of numerical fluid mechanics.

13. A device for implementing the method according to claim 1, comprising a grinding device to be controlled with sensors for detecting condition variables ($s_t$), actuating devices for carrying out actuating actions ($a_t$) and a control device connected to the grinding device.

14. The method according to claim 13, wherein the control device comprises a computing device.

15. The method according to claim 1, wherein the state variables ($s_t$) are detected by manual and/or automatic sample evaluations.

16. The method according to claim 1, wherein the at least two process models (PM) are created by expert knowledge.

17. The method according to claim 1, wherein the at least two process models (PM) are based on or trained on evolutionary strategies, genetic algorithms, genetic programming or evolutionary programming.

18. The method according to claim 17, wherein the at least two process models (PM) are based on or trained on the evolutionary strategies, the genetic algorithms, the genetic programming or the evolutionary programming within a framework of an autonomous selection and/or optimisation process.

19. The method according to claim 1, wherein a group and a new process model are created if state variables ($s_t$) of the system are detected which are not yet classified in any group.

* * * * *